Patented Jan. 29, 1946

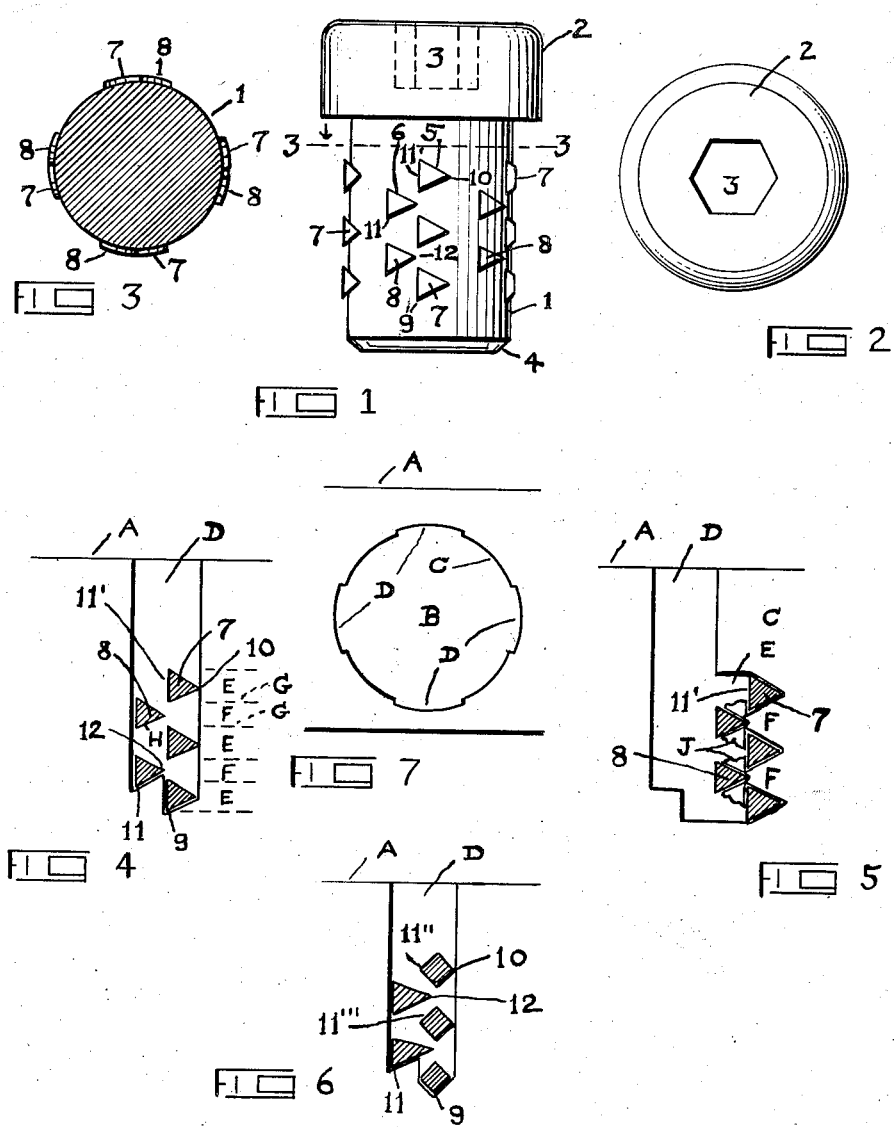

2,393,923

UNITED STATES PATENT OFFICE 2,393,923

MULTIPLE ANCHORING MEANS

Edwin August Miller, Fairfield, Conn.

Application February 29, 1944, Serial No. 524,365

2 Claims. (Cl. 85—21)

This invention relates to multiple anchoring means for a driven member within a preformed passage.

The object of the invention is to provide an anchoring means that may be positively permanent or removable as may be predetermined therefor; to provide a preformed bore, or molded or die-cast passage in a receiving member for the full axial reception of the driven member; to provide for a relative lateral locking movement of fully axially assembled members; and to provide a blocking means deposit of displaced metal integral with the bore to prevent a lateral return of said movement and axial withdrawal.

The applicant is aware that the previous art discloses shank members having peripheral formations which, as the shank is driven within a preformed bore, cut their way into the wall of the bore, thus forming axially extending grooves therein and, upon full axial assembly, the shank is slightly rotated within the bore thereby forcing the shank projections laterally to form grooves in said wall at right angles to that of the axially extending grooves. The art however does not disclose any blocking means whereby the projections within the laterally extending grooves are locked therein against their lateral return. The present invention therefore introduces, as novel, such a blocking means by which there is accomplished a positive anchoring means for an axially inserted and relatively rotated assembled members, the same being an improvement of the device set forth in my earlier Patent Number 2,236,804 issued April 1, 1941.

With reference to the accompanying drawing, the Figure 1 is an upright view of the driving member; Figure 2 is a top view thereof; Figure 3 is a sectional view of said member taken on the line 3—3 of Figure 1; Figure 4 is a diagrammatic layout of flattened inner wall surface of the shank passage and sectional inserts of peripheral formations of the driven member in full axial home-driven position; Figure 5 is a similar diagrammatic layout, but showing said sections of peripheral formations in their laterally moved and permanently locked relation to said inner wall surface of the bore; Figure 6 shows in a similar layout peripheral formations in full axial home driven position, but adapted, when laterally moved and in locked relation to said wall surface of the bore, to be returned by means of applied force; and Figure 7 illustrates the top surface view of a workpiece within which is preformed a passage for the reception of an inserted shank member, the preformed passage including axial grooves to accommodate the peripheral formations.

With particular reference to the accompanying drawing, the numeral 1 designates the peripheral surface of the driving member having the upper end 2 and the hexagonal recess 3 within the top surface of the upper end 2, the lower end of the driving member being illustrated as having the bevel edge 4. The peripheral surface 1 is provided with fixed formations projecting slightly therefrom. These formations are preferably arranged upon the periphery 1 in groups of axially aligned and intimately associated initial row 5 and follower row 6 of axially spaced formations 7 and 8, respectively, each of the formations of both rows 5 and 6 having apexes 10 and 12, respectively, with cutting and forming propensities directed in the same lateral direction, the formations 8 of the axially aligned follower row 6 being staggered with relation to the formations 7 of the axially aligned initial row 5. While the contour of the formations 7 and 8, more or less arising abruptly from the peripheral surface 1, is not confined to what is illustrated, yet it is preferable to provide for each of the aligned formations 7 and 8 cutting and forming apexes 9 and 11, respectively, directed axially as well as those directed laterally, especially if these apexes 9 and 11 are required to axially cut downwardly extending grooves within the wall surface of the bore.

It is understood however that, if the preformed passage B in the work-piece A includes the molding or die-casting of such passage with the axially extending and merged grooves C preformed therewith, as illustrated by the Figure 7, the contour of each of the lowest formations 7 and 8 may omit the axially directed cutting apexes 9 and 11. The laterally directed apexes 12 of the staggered follower row 6 of axially aligned formations 8 are preferably in axial alignment with the bases 11' of the axially extending row 5.

While the grouped rows 5 and 6 of the formations 7 and 8, respectively, are illustrated as being quarter-peripherally positioned, it is to be understood that the invention is not to be confined to such group positioning as, for instance, a single group of initial and follower rows 5 and 6 is all that is essential to obtain a full performance of the locking efficiency of the device.

For the operation of the device, a bore or shank passage B in the receiving work-piece A is provided with a diameter that fits the peripheral surface 1 of the shank member. Where axially extending and merged grooves D of the wall C are not included in the preforming of the shank passage, the driving member in its assembly therein is forcibly driven axially within the passage and, as the first entering formations 7 and 8 of each group contact with the surface rim of the bore B, the apexes 9 and 11 begin to cut their way into the wall C of the bore B to admit the formations of the rows 5 and 6 along and within the merged grooves D thereby made, the other formations, in their axial alignment, following within such merged grooves D as the driven member advances within the wall C of the bore B. With the driven member fully inserted, or driven home as the case may be, within the bore B, a hex-wrench is placed within the hexagonal recess 3 of the upper end 2 and the shank in its home position within the bore B is forcibly rotated contra-clockwise, or clockwise if the apexes 10 and 12 are formed as thus directed. Such a rotation of the home-driven or inserted shank member is sufficient only to cause, with the aid of the cutting apexes 10, the formations 7 in the axially aligned row 5, to laterally cut their way into the wall surface of the bore B to provide laterally extending grooves E so spaced, each one from the others, that, between each of the grooves E, the wall C of the bore or shank passage B is left intact, as at F, designated by the Figure 4 by the dotted lines G. Immediately following, in their fixed staggered relation to the formations 7, the formations 8 of the follower row 6, with the aid of their respective cutting apexes 12, cut their way directly into the area F of the wall C, their advancing inclines H forcing aside displaced metal of the wall C and depositing the same integrally with the wall C up against the abrupt straight shoulder of the bases 11' of the adjacent formations 7, thus providing a permanent block J against their lateral return, thereby locking the shank member not only laterally, but also against withdrawal.

While the preferred character of the formations 7 and 8 is above set forth, yet it is evident that there are other formations that may be used to accomplish such anchoring results. The Figure 6, for example, shows, instead of the abrupt shoulder 11', that a rear apexed portion 11'' may be added to each of the formations 7. The operation in anchoring would then be identical with that already explained, excepting that the metal displaced by each of the formations 8 would be deposited against the inclines 11''' thereby blocking the lateral return of the formations 7 against accident, but permitting such return by means of manually applied force in reverse to that required in assembling by use of the hex-wrench, the apexes 11'' cutting through the blocking deposits.

I claim:

1. An anchoring means for a driven and rotated shank member within a preformed passage of a receiving member, said means including two associated and axially extending rows of spaced projections with which the periphery of the shank member is provided, certain of said projections being of such form as to provide a rearwardly facing and axially extending shoulder and all of said projections providing a cutting apex directed laterally-forward, the projections of the rear row, with relation to projections of the other row, being so staggered that the forwardly directed cutting apex of each projection of the rear row lies approximately between, and in line with, said shoulders of the projections of said other row.

2. A permanent multiple anchoring means for the assembly of an axially driven shank member within the shank passage of a receiving member, said means comprising multiple relatively laterally-spaced combinations of cutting elements, each combination arranged in two axially extending rows of spaced projections with which the periphery of the shank is provided, each projection being of an angular form providing a rearwardly-facing and axially extending shoulder and also cutting apexes directed, one axially and the other laterally-forward, and the projections of the rear row, with relation to projections of the other row, being so staggered that the forwardly directed cutting apex of each projection of the rear row lies approximately between, and in line with, the shoulders of said other row so that in rotating a driven shank, the projections of the rear row will cut into the interior wall of the shank passage, not having been cut by the projections of said other row in said rotation, and deposit material so displaced by the projections of the rear row against said shoulders of said other row to block a return rotation and withdrawal of the driven and rotated shank member.

EDWIN AUGUST MILLER.